US005604459A

United States Patent [19]

White

[11] Patent Number: 5,604,459

[45] Date of Patent: Feb. 18, 1997

[54] METHOD AND APPARATUS FOR MULTIPLYING A PULSE MODULATED SIGNAL BY AN ANALOG CONTROL SIGNAL

[75] Inventor: Katherine W. White, San Diego, Calif.

[73] Assignee: Qualcomm Incorporated, San Diego, Calif.

[21] Appl. No.: 622,180

[22] Filed: Mar. 25, 1996

Related U.S. Application Data

[63] Continuation of Ser. No. 283,307, Jul. 29, 1994, abandoned.

[51] Int. Cl.[6] .............................. G06F 7/44

[52] U.S. Cl. .............................. 327/356; 327/355

[58] Field of Search .............................. 327/355–361, 327/437

[56] References Cited

U.S. PATENT DOCUMENTS 4,906,873 3/1990 Shoemaker et al. .............. 327/357
4,978,873 12/1990 Shoemaker .............. 327/357
5,097,156 3/1992 Shimabukuro et al. .............. 327/357
5,107,149 4/1992 Platt et al. .............. 327/355

*Primary Examiner*—Toan Tran
*Attorney, Agent, or Firm*—Russell B. Miller; Katherine W. White

[57] ABSTRACT

The present invention is a novel and improved method and apparatus of multiplying an analog signal by a pulse modulated signal. The apparatus includes a CMOS or equivalent gate. The pulse modulated signal is applied to the input of the gate. The analog control signal is applied to the power pin of the part. The output of the gate is the product of the two signals. The output may be lowpass filtered to obtain a resultant analog value. A scaling and offset circuit can be used to scale the output to comprise a zero pulse width modulation value wherein the value of the analog control signal has no affect on the resultant analog value.

18 Claims, 3 Drawing Sheets

METHOD AND APPARATUS FOR MULTIPLYING A PULSE MODULATED SIGNAL BY AN ANALOG CONTROL SIGNAL

This is a continuation of application Ser. No. 08/283,307, filed Jul. 29, 1994, abandoned.

BACKGROUND OF THE INVENTION

I. Field of the Invention

The present invention relates to digital signal processing. More particularly, the present invention relates to a novel and improved apparatus and method for multiplying an analog control signal and a pulse modulated signal.

II. Description of the Related Art

Single bit pulse modulated signals are commonly used to interface digital circuitry with analog circuitry. A single bit pulse modulated signal can be the direct output of a digital circuit. The pulse modulated signal contains information in the percentage of time that the signal remains at a high logic level in comparison to the total period of the pulse modulated signal. To control analog circuitry, such a pulse modulated signal is often lowpass filtered so that the average analog value of the signal is found. The averaged analog control signal can interface directly with analog circuitry.

A need may arise to multiply a pulse modulated signal with an analog control signal. Such a need may arise when the resultant averaged analog control signal needs to vary in response to two different signals. The present invention provides an inexpensive method and apparatus to achieve the multiplication of a pulse modulated signal with an analog control signal.

SUMMARY OF THE INVENTION

The present invention is a novel and improved method and apparatus for multiplying an analog control signal level times a pulse modulated signal. The invention comprises a CMOS or equivalent logic family gate. The pulse modulated signal is coupled to the input of the gate. The analog control signal is applied to the power pin of the gate. The output of the gate is lowpass filtered to produce a DC average output which is the product of the pulse modulated signal and the analog control signal. A simple variable offset and scaling circuit can be used to change the range of operation of the multiplying circuit to include a zero pulse modulation value at which the value of the analog control signal has no effect on the resultant product.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
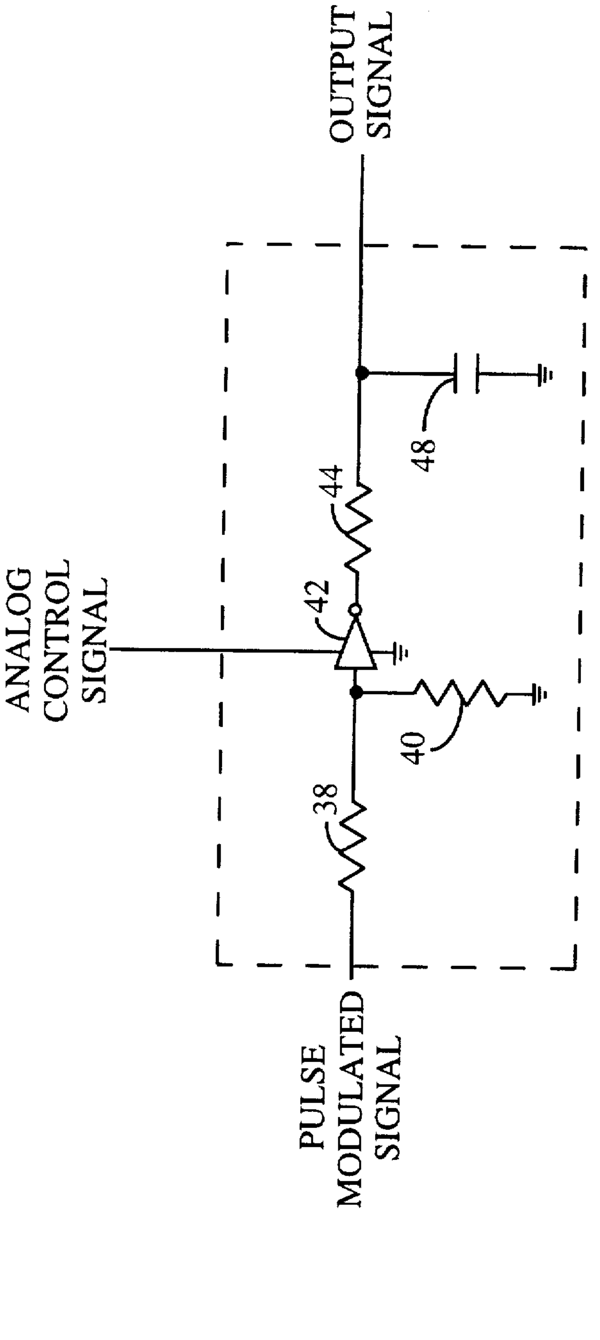
FIG. 1 is a schematic representation of the present invention.

Pulse width modulated (PWM) and pulse density modulated (PDM) signals are commonly used to interface to analog circuitry from digital circuitry. PWM signals are well known in the art and operate such that the duty cycle of the single bit digital signal is proportional to the desired resultant analog value. PDM signals work on a similar principal and are disclosed in co-pending U.S. patent application Ser. No. 08/011,618, entitled "PULSE DENSITY MODULATION CIRCUIT (PARALLEL TO SERIAL)" assigned to assignee of the present invention, incorporated herein by this reference, now issued as U.S. Pat. No. 5,337,338. With either pulse modulated signal the value of the signal is determined by the ratio of the time spent at logic level high each period to the total time of each period.

PWM and PDM signals are single bit digital signals typically used to allow digital circuitry to interface with analog circuitry. The single bit digital signal is lowpass filtered to create an analog control signal. The purpose of the lowpass filter is to average the discrete logic levels of the single bit digital signal to produce a constant analog control signal output.

The present invention addresses the situation where an analog control signal (which itself could be derived from a PWM or PDM signal) and a PWM or PDM signal both are needed to control a single analog circuit. Such a case might arise when a variable gain amplifier has a gain that is a function of a digital command and as a function of temperature. Typically a variable gain amplifier receives and analog signal level that determines the gain thereof. If a temperature dependent analog signal exists and the digital command is in the format of a pulse modulated signal, these two signals must be combined before being applied to the variable gain amplifier. If the two signals need to be effectively multiplied, there are two prior art methods to do so.

The first method would be to convert the analog control signal to a digital signal and perform the multiplication of the signals in digital circuitry and produce a single resultant PWM or PDM signal to be converted to analog. This has the undesirable feature of requiring an expensive, space and power consuming, analog to digital converter. A second method would be to convert the original PWM or PDM signal to analog and then multiply the two signals with an analog mixer. The second method is also bulky and expensive and can be plagued by stray D.C. offsets.

The present invention uses a single CMOS (or equivalent) logic gate to perform the multiplication function. CMOS gates have the unique feature that the output logic level high voltage tracks the voltage applied to the Vcc pin quite closely. A typical CMOS gate operates over a wide range of Vcc voltages. For example the following data is taken from TC7SO4F single gate CMOS inverter made by Toshiba of Tokyo, Japan.

| Vcc | Minimum voltage output logic level high over −40 to +85° C. |
|---|---|
| 2.0 V | 1.9 V |
| 4.5 V | 4.4 V |
| 6.0 V | 5.9 V |

Even with the wide variety of Vcc levels available, the input of the CMOS gate is relatively insensitive to variations in input level. For example the following data is taken from the TC7SO4F.

| Vcc | Minimum high level input over −40 to +85° C. |
|---|---|
| 2.0 V | 1.5 V |
| 4.5 V | 3.15 V |
| 6.0 V | 4.2 V |

| Vcc | Minimum low level input over −40 to +85° C. |
|---|---|
| 2.0 V | 0.5 V |
| 4.5 V | 1.35 V |
| 6.0 V | 1.8 V |

Using the above parameters, a multiplication of a PWM or PDM signal with an analog control signal can be accomplished. The analog control signal is applied to the Vcc pin and the PWM or PDM signal is applied to the logic gate input. FIG. 1 shows an implementation of the present invention. The input pulse modulated signal (PWM or PDM) is applied through a resistive voltage divider made up of resistor 38 and resistor 40 to the input pin of inverter 42. The analog control signal is applied to the power input (Vcc) pin of inverter 42. The output of the inverter is filtered by resistor 44 and capacitor 48 typically configured as a lowpass filter. In this manner the analog output of the lowpass filter is the resultant product of the voltage value of the analog control signal and the ratio value of the PWM or PDM signal.

The resistive divider made up of resistor 38 and resistor 40 scales the pulse modulated signal levels to acceptable levels dependent on the expected range of the analog control signal. For example, if the PWM or PDM signal has a logic level low close to zero and a logic level high of 5 Volts and the analog control signal has a range of 4.5 to 6 Volts, the input to inverter 42 could be scaled such that the input to the gate is 4.3 Volts when the PWM signal is at a logic level high. This value meets the minimum input level for 6 Volt operation while not exceeding the minimum Vcc level of 4.5 Volts and risking damage to inverter 42. If a larger range of Vcc were desired, an active divider could be designed to match the input logic level voltage to the value of Vcc.

Figure 2A:
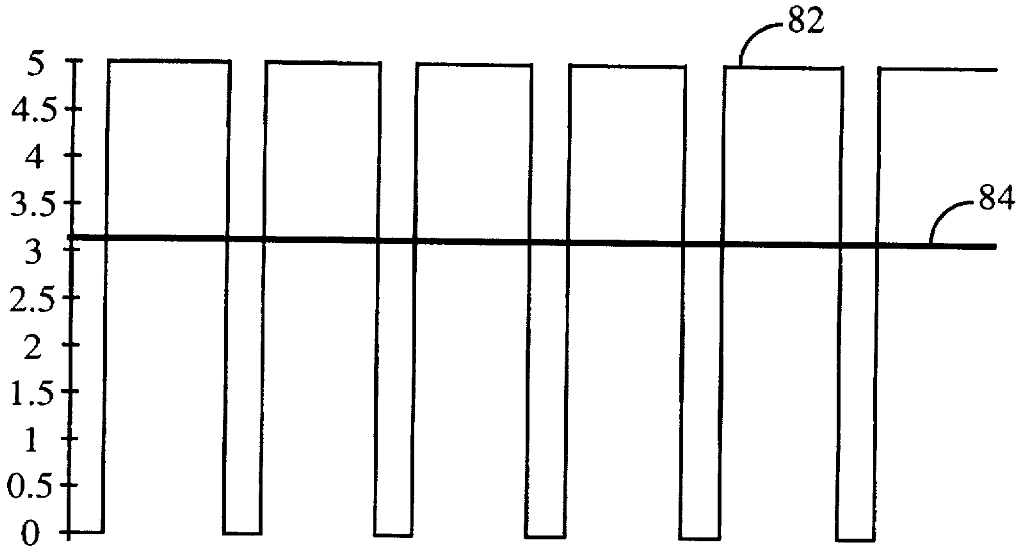
FIGS. 2A–2B illustrate input and output waveforms of the present invention.
Figure 2B:
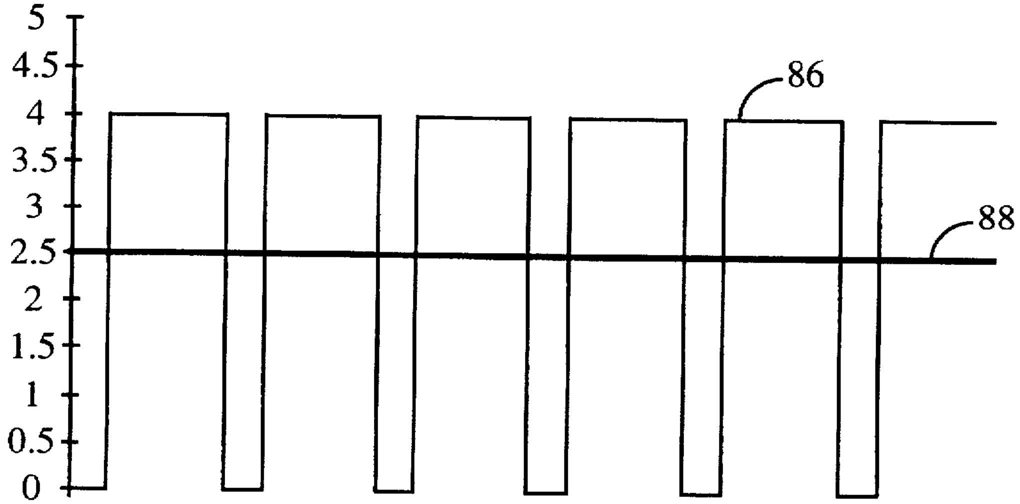

FIGS. 2A and 2B show an exemplary set of output waveforms for the circuit shown in FIG. 1. In FIG. 2A, a PWM signal (not shown) with a 62.5% duty cycle is input into the inverter. The analog control signal applied to the Vcc pin has a value of 5 Volts. Squarewave 82 represents the waveform output from the inverter. Analog control signal 84 represents the resultant product at the output of the lowpass filter. The analog output is 3.125 Volts which is equal to the duty cycle of the PWM signal times the analog control signal applied to the Vcc pin.

In FIG. 2B, the input PWM signal (not shown) remains the same. The analog control signal applied to the Vcc pin has dropped to 4 Volts. Squarewave 86 represents the waveform output from the inverter. Analog control signal 88 represents the resultant product at the output of the lowpass filter. The value of the resultant product is now 2.5 volts or the product of the PWM duty cycle times the value of the analog control signal applied to Vcc.

Figure 3:
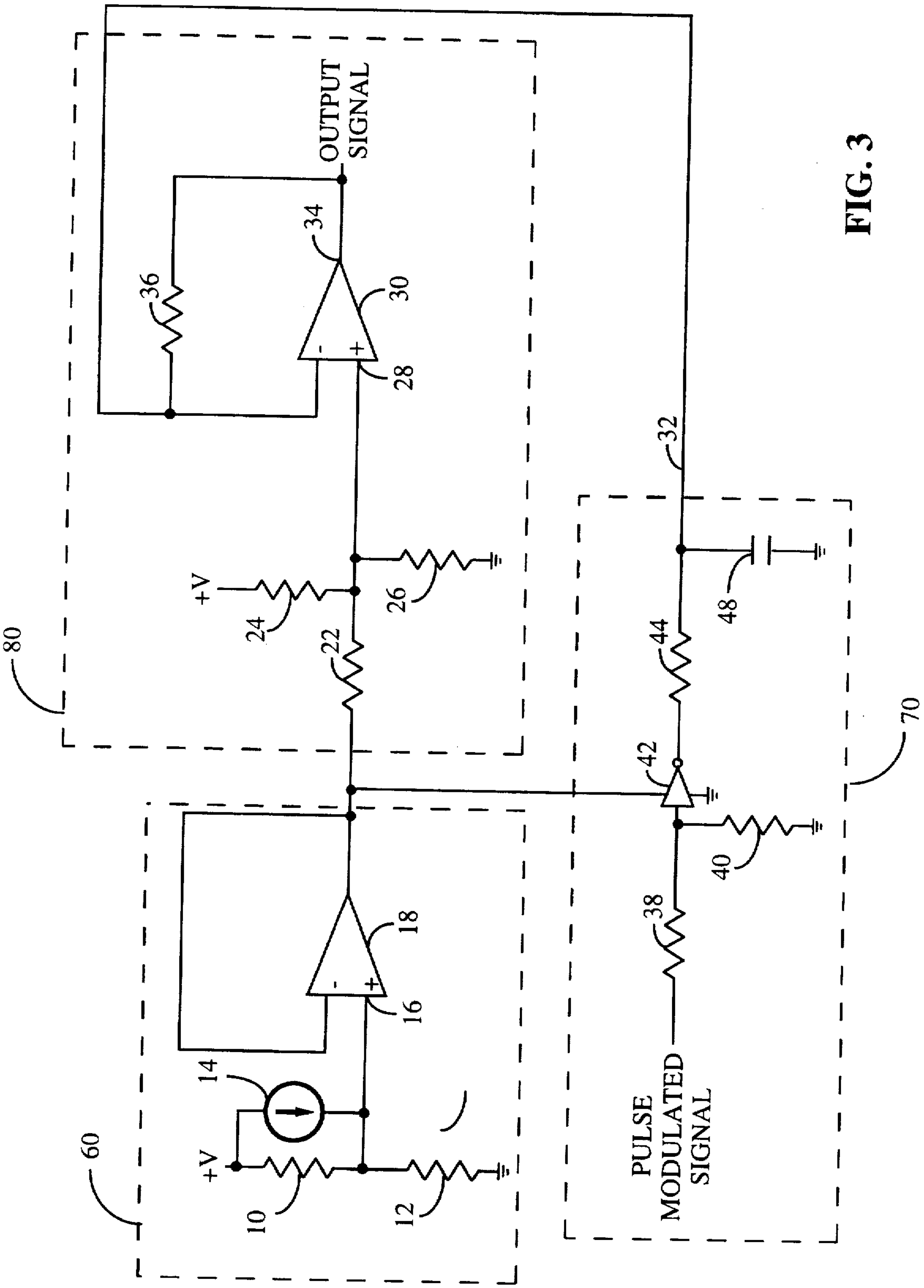
FIG. 3 is a schematic representation of the present invention incorporated into a preferred embodiment.

FIG. 3 is a schematic illustrating the present invention incorporated into a preferred embodiment. In FIG. 3 the PWM signal is applied to the resistive divider comprised of resistors 38 and 40. The analog control signal applied to Vcc of inverter 42 is generated by block 60. Temperature dependent current source 14 outputs a current based on the present temperature. Resistors 10 and 12 provide bias for temperature dependent current source 14. Buffer 18 buffers temperature dependent voltage 16 to create analog control signal to be applied to the Vcc pin of inverter 42.

In FIG. 3 the output of the circuit has been offset such that output 34 is centered around zero Volts. Offset control circuit 80 provides that function. In this case, inverter output 32 is applied to buffer 30 after it has been filtered by a lowpass filter comprised of resistor 44 and capacitor 48. Positive input 28 is dependent on the value of analog control signal output from buffer 18. Resistors 22, 24, and 26 provide the necessary offset and scaling.

This offset circuit allows a "zero" pulse modulation value to exist. At the zero pulse modulation value, the output of the circuit is independent of the value of the analog control signal (such as any number multiplied by zero is zero.) In this case, the 50% value of the pulse modulated signal is chosen to map to the zero pulse modulated value. Also in this case, the output zero value was mapped to zero Volts. Both the zero pulse modulated value and the output zero voltage are set by the ratio of resistors 22, 24, and 26, and can be mapped to any value. Table I gives a series of analog output voltages over a variety of pulse modulation percentages and analog control signal (ACS) values.

TABLE I

| Pulse modulated value ⇓ | ACS value ⇒ | 4.5 V | 5 V | 5.5 V | 6 V |
|---|---|---|---|---|---|
| 0% | | −2.25 | −2.50 | −2.75 | −3.00 |
| 10% | | −1.80 | −2.00 | −2.20 | −2.40 |
| 20% | | −1.35 | −1.50 | −1.65 | −1.80 |
| 30% | | −0.90 | −1.00 | −1.10 | −1.20 |
| 40% | | −0.45 | −0.50 | −0.55 | −0.60 |
| 50% | | 0.00 | 0.00 | 0.00 | 0.00 |
| 60% | | 0.45 | 0.50 | 0.55 | 0.60 |
| 70% | | 0.90 | 1.00 | 1.10 | 1.20 |
| 80% | | 1.35 | 1.50 | 1.65 | 1.80 |
| 90% | | 1.80 | 2.00 | 2.20 | 2.40 |
| 100% | | 2.25 | 2.50 | 2.75 | 3.00 |

Obviously there are many variations to the present invention. The type of gate used in this example was an inverter. Almost any other type of gate could be used. The preferred embodiment also used a CMOS family gate. Any other logic family exhibiting similar characteristics could be substituted. The lowpass filter and input scaling may be eliminated or moved throughout the circuit in some applications.

The previous description of the preferred embodiments is provided to enable any person skilled in the art to make or use the present invention. The various modifications to these embodiments will be readily apparent to those skilled in the art. The generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for multiplying an analog control signal times a digital pulse modulated signal comprising:

means for receiving and scaling said pulse modulated signal to produce a scaled pulse modulated signal;

logic gate having a signal input for receiving said scaled pulse modulated signal, having a power input for receiving said analog control signal, and having an output for providing a resultant digital product; and a filter for receiving said resultant digital product and providing a resultant analog product.

2. The apparatus for multiplying of claim 1 further comprising a scaling circuit for receiving said resultant analog product and said analog control signal and providing a scaled resultant analog product.

3. The apparatus for multiplying of claim 1 wherein said pulse modulated signal is a pulse width modulated signal.

4. The apparatus for multiplying of claim 1 wherein said pulse modulated signal is a pulse density modulated signal.

5. The apparatus for multiplying of claim 1 wherein said logic gate is from a CMOS logic family.

6. An apparatus for multiplying an analog control signal by a pulse modulated signal comprising:

a logic gate having a digital input, a power input, and a digital output;

a pulse modulated signal having a ratio value equal to the percentage of time said pulse modulated signal has a logic high level during each period of said pulse modulated signal, coupled to said digital input of said logic gate;

an analog control signal having a DC voltage level coupled to said power input of said logic gate; and a resultant digital product signal produced by said digital output of said logic gate having a logic high voltage level equal to said DC voltage level and having a ratio value equal to said ratio value of said pulse modulated signal.

7. The apparatus for multiplying of claim 6 further comprising an offset circuit coupled to said digital output and said power input of said logic gate and having an analog output.

8. The apparatus for multiplying of claim 7 wherein a resultant analog control signal having a resultant voltage level is produced by said analog output of said offset circuit wherein at a first ratio value of said pulse modulated signal said resultant voltage level is unaffected by said DC voltage level of said analog control signal.

9. A multiplying circuit for an analog control signal and a digital pulse modulated signal comprising:

a logic gate having a signal input coupled to said digital pulse modulated signal, having a power input coupled to said analog control signal, and having an output providing a resultant digital product; and a filter having an input coupled to said output of said logic gate and having an output providing a resultant analog product;

wherein said analog control signal takes on a plurality of voltage levels over time.

10. The multiplying circuit of claim 9 further comprising a scaling circuit having an input coupled to said output of said filter and said analog control signal and having an output providing a scaled resultant analog product.

11. The multiplying circuit of claim 9 further comprising a scaling circuit having an input coupled to said digital pulse modulated signal and having an output coupled to said signal input of said logic gate.

12. The multiplying circuit of claim 9 wherein said digital pulse modulated signal is a pulse width modulated signal.

13. The multiplying circuit of claim 9 wherein said digital pulse modulated signal is a pulse density modulated signal.

14. The multiplying circuit of claim 9 wherein said logic gate is from a CMOS logic family.

15. The multiplying circuit of claim 9 wherein said logic gate is a digital inverter.

16. A method for multiplying an analog control signal by a digital pulse modulated signal comprising the steps of:

receiving said digital pulse modulated signal at a signal input of a digital device, said digital pulse modulated signal having a first logic level voltage and a second logic level voltage and having a ratio value determined by the amount of time said digital pulse modulated signal is at said first logic level;

receiving an analog control signal at a power input of said digital device; and producing at an output of said digital device a scaled signal having a scaled first logic level voltage in proportion to said analog control signal and a scaled second logic level in proportion to said analog control signal.

17. The method for multiplying of claim 16 further comprising the step of filtering said scaled first logic level voltage and said scaled second logic level voltage to produce an analog signal proportional to said analog control signal and said ratio value.

18. The method for multiplying of claim 16 further comprising the step of summing and scaling by an offset control circuit said scaled first logic level voltage and said scaled second logic level voltage and said analog control signal to produce an analog output signal such that a zero ratio value exists wherein when said ratio value of said digital pulse modulated signal is equal to said zero ratio value, the value of said analog output signal is independent of said analog control signal.

* * * * *